W. T. BONNER.
BRAKE AND BRAKE LINER.
APPLICATION FILED JULY 27, 1909.
1,117,774.
Patented Nov. 17, 1914.
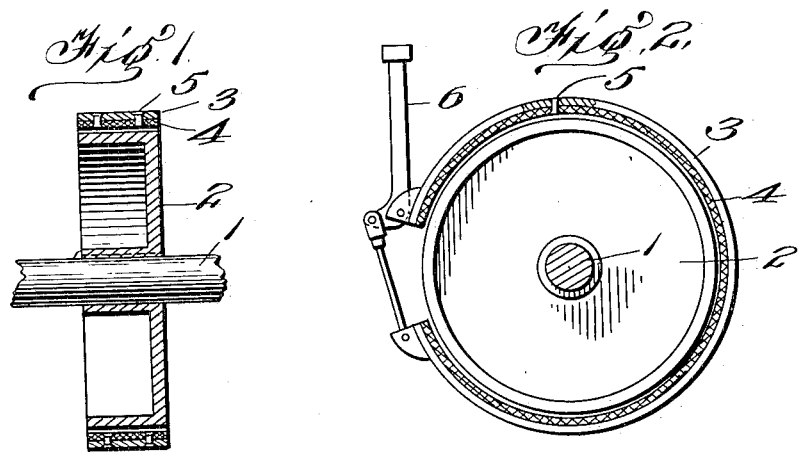
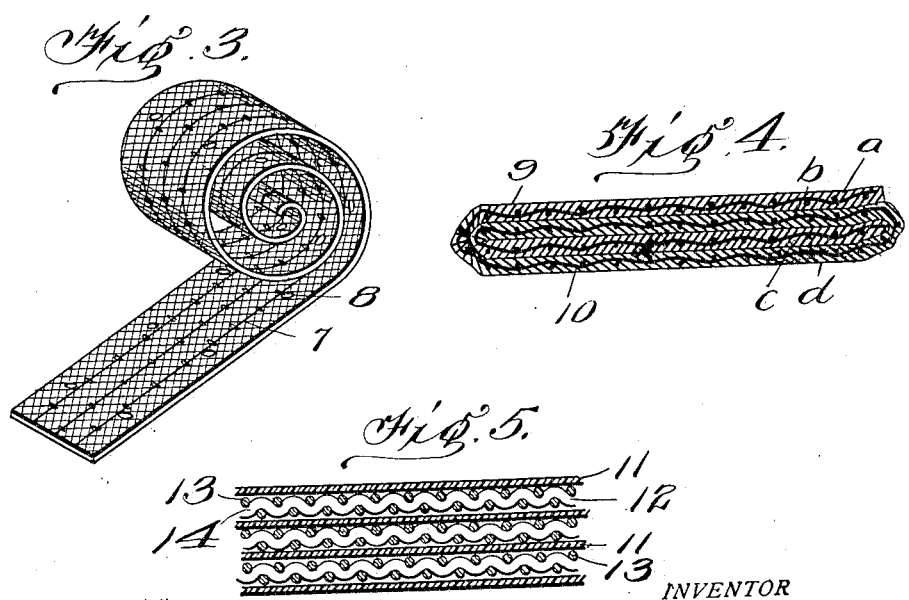
WITNESSES
Geo. L. Thom
M. C. Massie
INVENTOR
William T. Bonner
K. P. McElroy
Attorney

UNITED STATES PATENT OFFICE.

WILLIAM T. BONNER, OF TRENTON, NEW JERSEY, ASSIGNOR, BY MESNE ASSIGNMENTS, TO THE ASBESTOS BRAKE COMPANY, OF TRENTON, NEW JERSEY, A CORPORATION OF NEW JERSEY.

BRAKE AND BRAKE-LINER.

1,117,774.     Specification of Letters Patent.     Patented Nov. 17, 1914.

Application filed July 27, 1909. Serial No. 509,880.

*To all whom it may concern:*

Be it known that I, WILLIAM T. BONNER, a citizen of the United States, residing at Trenton, in the county of Mercer and State of New Jersey, have invented certain new and useful Improvements in Brakes and Brake-Liners, of which the following is a specification.

This invention relates to brakes and brake-liners; and it comprises a brake comprising a friction liner comprising a plurality of layers or plies of fabric comprising interwoven metal strands, said layers or plies being spaced and united by an elastic cementing material, and a holding member for such liner; and it also comprises a liner for said brakes comprising a plurality of layers or plies of fabric comprising interwoven metal strands, said layers or plies being spaced and united by a resilient cementing material; all as more fully hereinafter set forth and as claimed.

In the manufacture of brakes for high-duty purposes, such as strap brakes for automobiles, a number of conflicting requirements must be satisfied. The braking member must be of comparatively small dimensions and must be therefore of strong material, it must not wear smooth, and it must provide for a variety of engagements between locking-engagement and no-engagement. These requirements it is difficult to find united in a single friction material. Metal soon wears smooth and does not give the varied engagements practically necessary, while most other materials are structurally weak and not well adapted for the severe duty of a brake. With strap brakes, such as those usually employed in automobiles, these difficulties are accentuated for the reason that the braking surface is quite limited. In another application, filed January 20, 1908, and bearing the official Serial No. 411,599, I have disclosed and claimed sundry compound brakes and braking materials meeting the requirements of practice. In this invention, I employed a plurality of united layers or plies of fabric comprising interwoven wire with a rubber cement material spacing and uniting the several plies. Prior to forming the fabric used for the several plies or layers, the wire was covered with a jacketing coating of asbestos spun or woven therearound. The coated wire was woven into fabric form, the fabric given a facing layer or "frictioning" of rubber and the several plies assembled under pressure, stitched together, and vulcanized. A compound laminated fabric formed as so described on assemblage with suitable holding means, such as those of a strap brake of an automobile, gives an efficient friction member. There being no vegetable fiber in this friction member, heating under conditions of use is not materially deleterious. In another application filed January 20, 1909, Sr. No. 473,317 (now matured into Patent 931,988, Aug. 24, 1909) I have disclosed sundry other types of friction member also embodying an assemblage of a plurality of plies or layers comprising interwoven metal strands. In the specific friction members disclosed in this case, a plurality of plies or layers of material comprising wire fabric are assembled under hydraulic pressure to form a lining for brake members. The wire fabric plies, as there described, may be separated and united by intervening layers of cementing material, such as rubber, as in the prior application acknowledged, or may be forced into mutual metallic contact, the latter type of friction member being claimed.

The type of friction liner in which the plies comprising the interwoven wire are spaced and separated by intermediate cementing material such as rubber, has a number of practical advantages. Wire, asbestos, and the like are not in and of themselves resilient or flexible materials and resiliency is of course eminently desirable in securing the graduated series of engagements required of a brake in practice. Wire fabric, either with or without interwoven asbestos, and an asbestos fabric itself both have more resiliency, owing to the woven form, but in practice neither has as much as is desirable for the present purpose. But by uniting several layers or plies by intermediate layers of an elastic cementing material such as rubber, the compound fabric as a whole is given a vertical compressibility between face and face in a degree highly useful for the present purposes. The resiliency of the intervening layers is added to that of the fabric layers, giving the laminated fabric as a whole great resiliency, while the wire gives ample strength, and being distributed throughout the compound fabric as a reinforcement, such fabric is very strong. The use of interwoven asbestos with the wire is useful as diminishing the conductivity of the liner for heat, but it diminishes somewhat the springiness of the compound fabric ply.

In the present invention therefore, I provide a brake having a liner comprising a plurality of plies or layers of interwoven wire, each pair of said layers being spaced apart and united by intervening layers of elastic cementitious material, such material being preferably rubber or rubber composition, though other similar strong, springy compositions may be employed. The interwoven wires of any given layers are in metallic contact.

Wire fabric, which may be either knit or woven, is provided with a facing layer of rubber or rubber compound and a plurality of plies or layers of the treated rubber fabric are assembled to form a laminated rubber fabric. The rubber is applied to the material in the unvulcanized condition and after assembling the several plies or layers, the assemblage is vulcanized under pressure, thereby converting the rubber between the several layers into an integral body spacing and uniting such layers. The layers of the compound fabric thus formed may also be stitched together if desired. Strips of the compound fabric of suitable shape and dimensions may be readily assembled with a holding member of any kind, as with the strap or a strap brake of an automobile.

The wire employed may be brass, copper, steel or any convenient metal. The rubber may be applied in any fluent form, either as a thin composition or as a thicker; in the former case permeating the wire fabric and upon vulcanization becoming converted into a body of rubber which is integral throughout the body of the compound fabric. The extent of the permeation also of course depends somewhat on the closeness of mesh of the fabric, whether consisting of wire alone or of interwoven wire and asbestos. A close-woven fabric is desirable for the present purposes.

In the present embodiment of this invention, it is desirable that the rubber, whether penetrating or not, shall be present in sufficient amount to give intercalated spacing and uniting layers thereof between the fabric layers. The presence of these intervening layers gives the assemblage as a whole considerable flexibility and face-to-face compressibility which are desirable for many reasons. The flexibility promotes the possibility of securing the desired series of graduated engagements in braking, gives longer life to the liner and is very convenient in assembling liner and holding element. In assembling with a brake strap, for instance, the presence of these intervening rubber layers allows a convenient curving of the liner strip, the fabric layers being able to yield somewhat longitudinally, and thus rendering possible an accurate fit between liner and holding element. At the same time, the layer of rubber between any pair of wire fabric plies being relatively thin, the rubber has the great strength of a short column of rubber. The several plies or layers of heat-conductive wire fabric being separated by the thermally non-conductive rubber, the heat developed in the ply which happens to form the braking face is not communicated to the inwardly located plies. Most of the friction in use is localized and the wires of the layer in engagement being all in metallic contact the heat is distributed through such layer. In use, the braking face wears to expose a wire surface composed of wires crossing each other at an angle and therefore giving a high coefficient of friction while these wires are backed, supported and anchored by the rubber behind, which, in turn, depends upon the next wire fabric layer or ply for mechanical support.

In the accompanying illustration I have shown, more or less diagrammatically, certain embodiments of the described invention.

In this showing:—Figure 1 is a vertical transverse section of a brake spool and brake provided with the stated liner; Fig. 2 is an elevation partly broken away at right-angles to the view of Fig. 1; Fig. 3 is a view in perspective of a portion of a coil of laminated liner ready for application; Fig. 4 is a section on a greatly enlarged scale of a rubber-impregnated fabric folded to form a liner having several layers or plies; and Fig. 5 is a section of a liner composed of alternating layers or plies of wire fabric and rubber composition.

In Figs. 1 and 2, 1 is the shaft of an element to be braked, as an automobile shaft, carrying a hub or spool 2 having a rim or periphery adapted for braking. With this engages a strap brake 3 carrying a liner 4 secured thereto by bolts or rivets 5. As shown, this brake is applied in the usual manner by element 6. In Fig. 3 the compound laminated liner is shown in perspective, and as provided with stitching 7 and orifices 8 which may serve in fastening the liner to the holding element by bolts and nuts. In Fig. 4 the liner fabric is shown on a greatly enlarged scale as consisting of layers 9 of rubber and layers 10 of wire fabric. A sheet of fabric is shown as folded into a plurality of layers or plies marked respectively a, b, c, and d. In the showing the rubber of the several plies is shown as discrete and separate for the convenience of illustration. In the manufacture of a sheet of liner, the several plies would be vulcanized under pressure which would cause the rubber of layers a, b, c, and d to coalesce to form an integral body of rubber permeating the whole structure. In Fig. 5 is shown a liner composed of a series of alternate layers or plies of rubber composition 11 and wire fabric 12, this wire fabric being made in the usual manner of interwoven crossing wires 13 and 14. As shown in this figure for the convenience of illustration, the rubber layers and the layers of wire fabric also are shown as discrete. In practice the several plies would be assembled under pressure and vulcanized, causing the intercalated rubber layers and the facing rubber layers to unite firmly and cohere to the wire fabric layers.

The structure of Fig. 5 may be made in the same manner as that of Fig. 4, by folding a sheet of coated fabric on itself a number of times to form the desired number of plies, or the several plies may be cut to shape and size and united directly. However assembled, the plies are placed together under pressure and vulcanized to cause the stated union. After uniting the fabric may be stitched as shown in Fig. 3. The upper three layers of Fig. 5 may be taken as showing a section of the sheet from which the laminated fabric is formed.

For convenience of illustration the wire fabric is shown as of opener mesh than is usual in practice. In practice it is desirable to use a close-meshed wire fabric into which the rubber, in the present embodiment of my invention penetrates but superficially, forming for the most part an intercalated elastic layer between the plies of the wire fabric and penetrating the wire fabric merely sufficient to key it thereto.

As stated, the wires prior to forming the layer of interwoven wire, may be coated with asbestos or other fibrous bodies, the coated wires woven into fabric form and then united by intercalated layers of rubber. But this matter I do not herein claim specifically, it forming the subject matter of my acknowledged co-pending application #411,599.

In the present embodiment of my invention I prefer the wire to be uncoated with textile fabric, whether asbestos or vegetable fiber, so that the interwoven wires are in metallic contact. Where the wire is so coated with a textile fiber prior to weaving the wires which are interwoven do not come into actual metallic contact and this aids in diminishing the heat conductivity of the liner as a whole since the heat cannot be propagated from wire to wire. Asbestos and the like are not good conductors for heat. By allowing the wires of the fabric to come into actual contact, as in the present embodiment of my invention, while there is a greater conductivity for heat produced, yet the laminated fabric produced therefrom, as a whole, is more resilient, and is therefore preferable for braking purposes where high resiliency and good series of graduated engagements are desirable. With the intercalated layers of rubber between ply and ply little communication of heat can occur between the braking face and the body of the liner.

In producing a brake liner under the present invention, not only the wire fabric plies but the wires of the fabric itself may be spaced and united by rubber composition or equivalent springy composition. For this purpose, prior to weaving the wire into fabric form it may be given a coating of rubber, or composition comprising rubber, as if insulating it, and then woven into fabric form. The rubber should be applied in the unvulcanized form and the fabric cured under heavy pressure and tension. In so doing, after removal from the vulcanizing press, the wires retain their tension while the rubber, being set in final form in the vulcanization, is under no tension, but, on the contrary, on removal from the press is under compression in resisting the tension of the wire. In use in a strap brake, these internal stresses operate to resist the stress of the braking operation. The wire being under tension can not lengthen further while the rubber is already under compression.

What I claim is:—

1. In a brake, a liner comprising a plurality of layers of wire fabric having the wires of the fabric in metallic contact and intervening layers of elastic cement, said layers of wire fabric being spaced and united by said layers of elastic cement.

2. In a brake, a liner comprising alternate layers of rubber composition and fabric comprising interwoven wire having the wires of the fabric in metallic contact, said fabric layers being spaced and united by said rubber composition and said several layers being stitched together.

3. In a brake, a liner comprising a plurality of layers of wire fabric having the wires of the fabric in metallic contact and intervening layers of rubber composition, said fabric layers being spaced and united by said layers of rubber composition.

4. A brake comprising a holding element and a liner therefor consisting of a plurality of layers of wire fabric having the wires of the fabric in metallic contact and intervening layers of elastic cement, said layers of fabric being spaced and united by said layers of elastic cement.

5. A brake comprising a holding element and a liner therefor consisting of a plurality of layers of wire fabric having the wires of the fabric in metallic contact and intervening layers of rubber composition, said fabric layers being spaced and united by said rubber composition.

6. A brake comprising a holding element and a liner therefor consisting of a plurality of stitched layers of wire fabric having the wires of the fabric in metallic contact and intervening layers of elastic cement, said fabric layers being spaced and united by said layers of elastic cement.

7. A brake comprising a holding element and a liner therefor consisting of a plurality of stitched layers of wire fabric having the wires of the fabric in metallic contact and intervening layers of rubber composition, said fabric layers being spaced and united by said rubber composition.

In testimony whereof, I affix my signature in the presence of witnesses.

WILLIAM T. BONNER.

Witnesses:
 WM. A. TURMAN,
 W. A. FOOTE.